United States Patent [19]

Gascon

[11] 4,378,671
[45] Apr. 5, 1983

[54] RAKE

[76] Inventor: Lorenzo Gascon, 175 Archambault St., Hull, Quebec, Canada

[21] Appl. No.: 356,384

[22] Filed: Mar. 9, 1982

[51] Int. Cl.³ .......................................... A01D 7/00
[52] U.S. Cl. ............................ 56/400.12; 56/400.04
[58] Field of Search ........... 56/400.12, 400.16, 400.17, 56/400.18, 400.04

[56] References Cited

U.S. PATENT DOCUMENTS 3,601,966  8/1971  Kerry ................................ 56/400.12
4,292,794  10/1981  Gascon ............................. 56/400.16

Primary Examiner—Jay N. Eskovitz

Attorney, Agent, or Firm—Browdy and Neimark

[57] ABSTRACT

A pick-up rake having a main rake head and an auxilliary rake head movably mounted with respect to the main rake head, enabling the auxilliary rake head to be moved from a storage position adjacent to the main rake head to a position where the two rake head cooperatively act to grasp leaves and grass therebetween. When the auxilliary rake head is in storage position, the rake may simply be used in conventional manner in the raking of leaves and grass; while in pick-up configuration, the rake is useful enabling grass and leaves to be picked up avoiding the necessity of one having to stoop or kneel to gather leaves or grass for disposal.

4 Claims, 4 Drawing Figures

RAKE

The present invention relates to a rake and more particularly to a rake having auxilliary rake head means cooperating with a fixed rake head for enabling piles of leaves, grass or the like to be grasped and picked-up to simplify disposal in a container or wheelbarrow or other suitable receptacle.

The rake of the present invention is particularly advantageous inasmuch as it avoids the necessity of one having to stoop or kneel to gather leaves or grass for disposal for the movable action of the auxilliary and main rake heads enables the grasping and lifting and disposal of leaves or grass while the user remains in a standing position.

More specifically, the pick-up rake of the invention consists of a rake handle having fixed at one end a main rake head of conventional design and construction and which enables the raking or sweeping of leaves or grass in a conventional manner. Moveably carried by the rake handle is an auxilliary or secondary rake head assembly which includes an auxilliary rake head and which is movable as desired from a storage position to a pick-up position so that leaves and grass grasped between the rake heads may then simply be raised by the user and the rake heads then opened to dispose of the leaves or grass or clippings in a convenient manner without requiring the user to stoop or kneel to gather and collect the leaves.

DESCRIPTION OF PRIOR ART

The present applicant is the inventor and patentee in Canadian Pat. No. 1,027,412, granted Mar. 7, 1978, and entitled "RAKE". This prior Canadian Patent relates to a leaf and grass collecting rake generally similar to the arrangement of the present invention, and the rake of the prior Patent has been found to be efficient in its dual function of enabling the raking of leaves in conventional manner, and also when used in the collecting and lifting of leaves and grass and debris. With the arrangement of this Canadian Patent, however, the first and second rake heads are of generally similar width, and when in raised storage position, it has been found that the width of the raised rake head portion at times interferes with conventional raking movement by the user.

The present applicant is also the inventor and patentee in U.S. Pat. No. 4,292,794, granted Oct. 6, 1981, and entitled "RAKE". The assembly of this U.S. patent is an improvement over applicant's Canadian Pat. No. 1,027,412 as the auxilliary rake head is of reduced width in its raised storage position, thus minimizing interference during conventional raking movement. However, even with its reduced width the auxilliary rake head of U.S. Pat. No. 4,292,794 still presents some interference to normal raking and rake handling as a result of the position of the auxilliary rake head a distance up the rake handle.

The present invention constitutes an advantage over the assemblies of these two prior Patents by providing a pick-up rake having an auxilliary rake head which in storage position is adjacent to and overlies the main rake head thus completely eliminating any possibility of interference during conventional raking. The positioning of the auxilliary rake head in adjacent relationship with the main rake head when in storage position also results in better rake balance by positioning the weight of the assembly closer to the ground during use.

Other prior patent documentation known to the applicant and relating to rakes of the pick-up variety are as follows:

U.S. Pat. No. 2,797,544—July 2, 1957—H. H. Fite
U.S. Pat. No. 2,891,374—June 23, 1959—G. G. Richmond
U.S. Pat. No. 2,746,234—May 22, 1956—A. B. Utley
Canadian Pat. No. 454,621—Nov. 16, 1948—M. F. Zifferer The disadvantage of U.S. Pat. No. 2,891,374 is similar to that of Canadian Pat. No. 1,027,412 discussed above, and the remaining patents relate to pick-up rakes which are of different structural design and wherein provision is not made for raising an auxiliary rake head to upper storage position.

OBJECTS OF THE PRESENT INVENTION

The main object of the present invention is to provide a rake of the pick-up variety wherein an auxiliary rake head is movably mounted with respect to a fixed rake head of conventional design and which auxiliary rake head is selectively movable from a storage position adjacent the main rake head enabling normal raking to a pick-up position opposed to the main rake head enabling leaves, grass and debris to be gathered and held between the two rake heads.

More specifically, the present invention relates to a pick-up rake comprising a rake handle having a main rake head with a raking side and a rear side secured to its lowermost end, and an auxiliary rake head assembly including an auxiliary rake head carried by the rake handle which is selectively movable from a storage position adjacent the rear side of the main rake head enabling normal raking, to a pick-up position opposing the raking side of the main rake head enabling leaves, grass and debris to be gathered and held between the two rake heads, the auxiliary rake head assembly including a shaft pivotally secured at its upper end to a pair of outwardly extending sleeve arms which are fixedly secured to a handle sleeve which is mounted for guiding sliding movement along the rake handle, and a pair of auxiliary rake head guide arms pivotally secured to the shaft adjacent its lower end and pivotally secured to a collar carried by the rake handle, the collar being mounted for rotational movement with respect to the rake handle and being restrained against relative axial movement, and guide means for guiding movement of the handle sleeve with respect to the rake handle in a first selected path for guiding reciprocal movement of the auxiliary rake head assembly in pick-up capacity, and in a second selected path for guiding movement of the auxiliary rake head assembly to and from storage position.

In preferred construction, the guide means comprise first and second slots intersecting at their lowermost ends provided in the handle sleeve, and a guide pin on the rake handle for selectively engagement within the slots, the first slot extending longitudinally of the handle sleeve and the second slot extending divergingly upwardly with respect to the first slot, engagement of the guide pin within the first slot guiding movement of the auxiliary rake head assembly in pick-up capacity, and engagement of the guide pin within the second slot guiding movement of the auxiliary rake head assembly to and from storage position. In this arrangement, the rake handle has a second guide pin engaged in a circumferentially extending slot provided in the collar and which slot in the collar has a length substantially one-half of the circumference of the collar.

BRIEF DESCRIPTION OF THE ACCOMPANYING DRAWINGS

DETAILED DESCRIPTION OF THE ACCOMPANYING DRAWINGS

Figure 2:
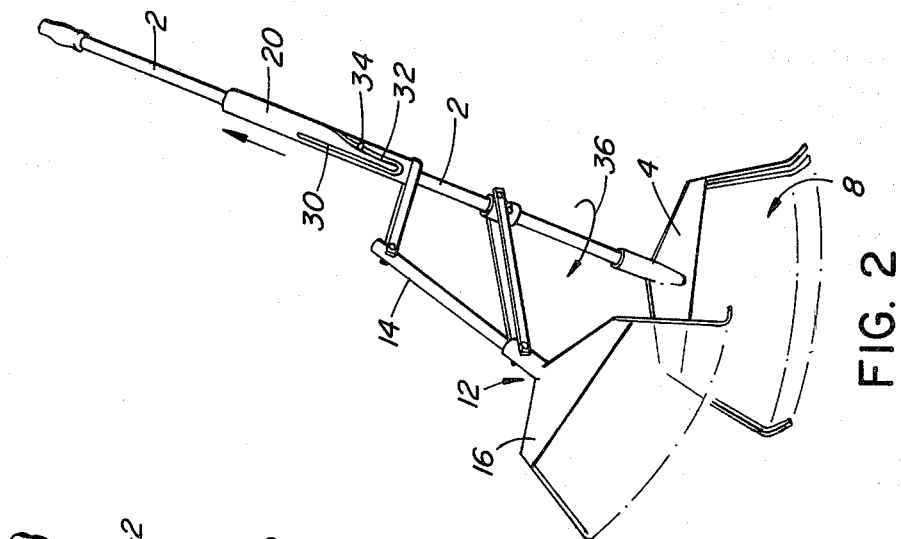
FIG. 2 is a perspective view illustrating the path of movement of the auxiliary rake head assembly from the storage position shown in FIG. 1 toward pick-up position.

The present invention will now be described with reference to the accompanying drawings wherein like reference numerals refer to like parts.

In the drawings, the rake handle is shown by numeral 2, and numeral 4 identifies the main rake head which may be of any conventional design having a plurality of tines 6. The angled configuration of the tips of the tines provides the rake head 4 with a raking side 8 and a rear side 10.

The rake handle 2 carries an auxiliary rake head assembly indicated generally by numeral 12. This auxiliary assembly includes an auxiliary rake shaft 14 which carries at its lower end an auxiliary rake head 16 which may be of conventional design, and which also has tines 6.

Pivotally attached to the upper end of shaft 14 are a pair of sleeve arms 18, which are fixedly secured to and extend outwardly from a handle sleeve 20 which is mounted for sliding movement on the handle 2 as will be explained in more detail below.

A collar 22 is mounted on the handle 2 below the handle sleeve 20 and this collar is mounted for rotational movement with respect to handle 2 but is restrained against any relative axial movement, and this conveniently can be accomplished by providing a circumferential slot 24 in the collar and which receives a guide pin 26 secured to the handle 2. The circumferential slot 24 has a length of approximately one-half the circumference of the collar 22.

Figure 3:
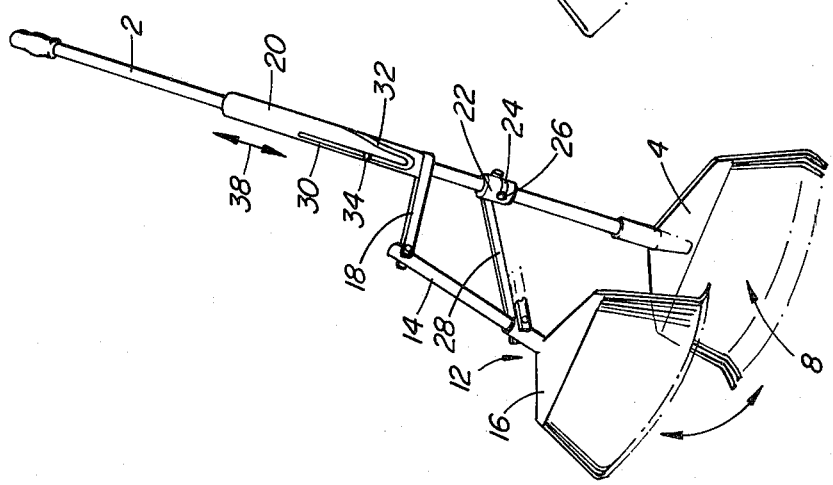
FIG. 3 is a perspective view illustrating the positioning of the auxiliary rake head assembly in pick-up position with respect to the main rake head.

A pair of auxiliary rake head guide arms 28 extend between the lower end of shaft 14 and the collar 22 and in FIG. 3, one of the arms 28 is shown in phantom to clearly illustrate the positioning of pivot pin 26 within the circumferential slot 24 of collar 22.

The handle sleeve 20 is mounted for sliding axial movement on the handle 2, and guide means are provided for guiding movement of the handle sleeve with respect to the rake handle in a first selected path for reciprocal movement of the auxiliary rake head assembly in pick-up capacity, and in a second selected path for movement of the auxiliary rake head assembly to and from storage position. This guiding may suitably be accomplished by providing the handle sleeve with first 30 and second 32 slots which intersect at their lowermost ends, and which selectively receive a guide pin 34 carried by and secured to the handle 2.

The first slot 30 extends longitudinally of the handle sleeve 20 and the second slot 32 extends divergingly upwardly with respect to the first slot, with the slots intersecting at their lowermost ends, as shown at 35.

Figure 1:
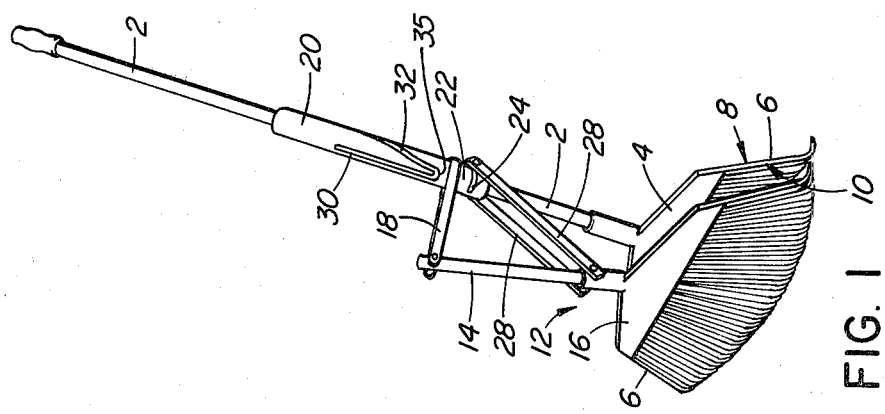
FIG. 1 illustrates the pick-up rake of the present invention showing the auxiliary rake head in storage position.

FIG. 1 illustrates the auxiliary rake head 16 in storage position, and in this position, the guide pin 34 is positioned at the uppermost end of the second slot 32. In this position, the auxiliary rake head 16 is positioned adjacent to the main rake head 4 and overlies the rear side of the main rake head in spaced relationship.

FIG. 1 illustrates the positioning of the auxiliary rake head when the present pick-up rake is to be used for the raking of debris and grass in conventional fashion.

Figure 4:
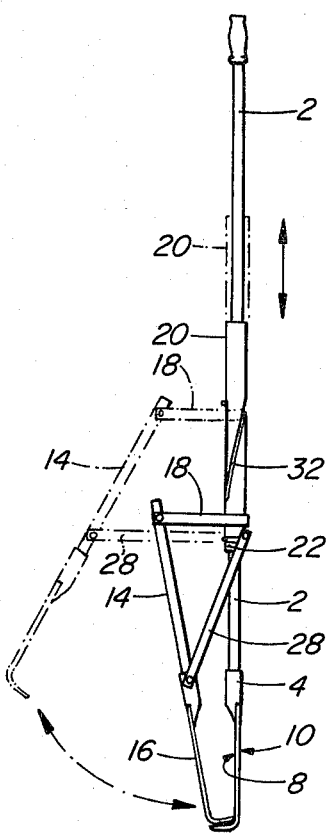
FIG. 4 is a side view illustrating in full lines the relative positioning of the rake heads in leaf and grass grasping position, and in broken lines the relative positioning of the rake heads in open or leaf and grass discharging position.

When it is desired to change the rake to pick-up capacity the handle sleeve 20 is drawn upwardly along the handle 2, and the action of guide pin 34 riding in slot 32 rotates the handle 2 and main rake head 4 with respect to the handle sleeve and auxiliary rake head assembly in rotational manner as shown by arrow 36 in FIG. 2. This rotational movement continues until the guide pin reaches the point of intersection of slots 30 and 32 at which time the raking sides of the two rake heads are in facing relationship generally as shown in FIGS. 3 and 4. With the guide pin 34 positioned in the lowermost end of slot 30, the rake heads 4 and 16 are spaced apart in the manner generally shown in FIG. 3, and axial downward movement of the handles sleeve 20 with respect to handle 2 (with guide pin 34 moving upwardly in slot 30) results in the two rake heads being brought together to grasp grass and debris as shown in full lines in FIG. 4. It will be appreciated that reciprocal movement of the handle sleeve 20 with respect to handle 2 in the direction illustrated by the arrow in FIG. 3 will result in a movement of auxiliary rake head 16 toward and away from the main rake head 4 in leaf-gathering and discharging positions. This movement is clearly shown in FIG. 4, which illustrates in full lines the positioning of the auxiliary head with respect to the main rake head when in leaf holding relationship and which shows in broken lines the positioning of the auxiliary head with respect to the main head when in leaf discharging relationship.

When it is desired to return the auxiliary rake head to the storage position as shown in FIG. 1, the handle sleeve is moved upwardly with respect to handle 2, and the handle sleeve 20 rotated to position guide pin 34 within slot 32 with downward movement of the handle sleeve 20 with respect to sleeve 2 then resulting in a pivoting movement of the handle 2 with respect to handle sleeve 20 (the reverse of that described above with respect to FIG. 2) to orientate the two rake heads to the storage position as shown in FIG. 1.

In the foregoing description and accompanying drawings, the guide means are described and illustrated as consisting of a guide pin 34 riding selectively within either of slots 30 or 32. It will be appreciated however that this guiding movement could equally be accomplished by providing the guide slots 30 and 32 in the handle itself and by providing the handle sleeve with an inwardly directed guide pin for selective engagement within the slots in the handle 2.

The length of the slot 24 in collar 22 which receives guide pin 26 need only be of a length to enable the necessary rotation to occur, and an equivalent arrangement permitting rotation of the collar while restraining axial movement of the collar with respect to the handle 2 is possible without departing from the inventive concept.

Component parts of the present pick-up rake can conveniently be made of appropriate materials such as plastic, or metal, such as aluminum, or magnesium for strength with light weight.

I claim:

1. A pick-up rake comprising a rake handle having a main rake head with a raking side and a rear side secured to its lowermost end and an auxilliary rake head assembly including an auxilliary rake head carried by the rake handle which is selectively movable from a storage position adjacent the rear side of the main rake head enabling normal raking to a pick-up position opposite the raking side of the main rake head enabling leaves, grass and debris to be gathered and held between the two rake heads, the auxilliary rake head assembly including a shaft pivotally secured at its upper end to a pair of outwardly extending sleeve arms which are fixedly secured to a handle sleeve which is mounted for guided sliding movement along the rake handle, and a pair of auxilliary rake head guide arms pivotally secured to the shaft adjacent its lower end and pivotally secured to a collar carried by the rake handle, the collar being mounted for rotational movement with respect to the rake handle and being restrained against relative axial movement, and guide means for guiding movement of the handle sleeve with respect to the rake handle in a first selected path for reciprocal movement of the auxilliary rake head assembly in pick-up capacity, and in a second selected path for movement of the auxilliary rake head assembly to and from storage position.

2. A rake according to claim 1, the guide means comprising first and second slots intersecting at their lowermost ends provided in the handle sleeve, and a guide pin on the rake handle for selective engagement within the slots, the first slot extending longitudinally of the handle sleeve and the second slot extending divergingly upwardly with respect to the first slot, engagememt of the guide pin within the first slot guiding movement of the auxilliary rake head assembly in pick-up capacity, and engagement of the guide pin within the second slot guiding movement of the auxilliary rake head assembly to and from storage position.

3. A rake according to claim 1, the rake handle having a second guide pin engaged in a circumferentially extending slot provided in the collar.

4. A rake according to claim 3, wherein the slot in the collar has a length substantially one-half of the circumference of the collar.

* * * * *